Patented Jan. 9, 1923.

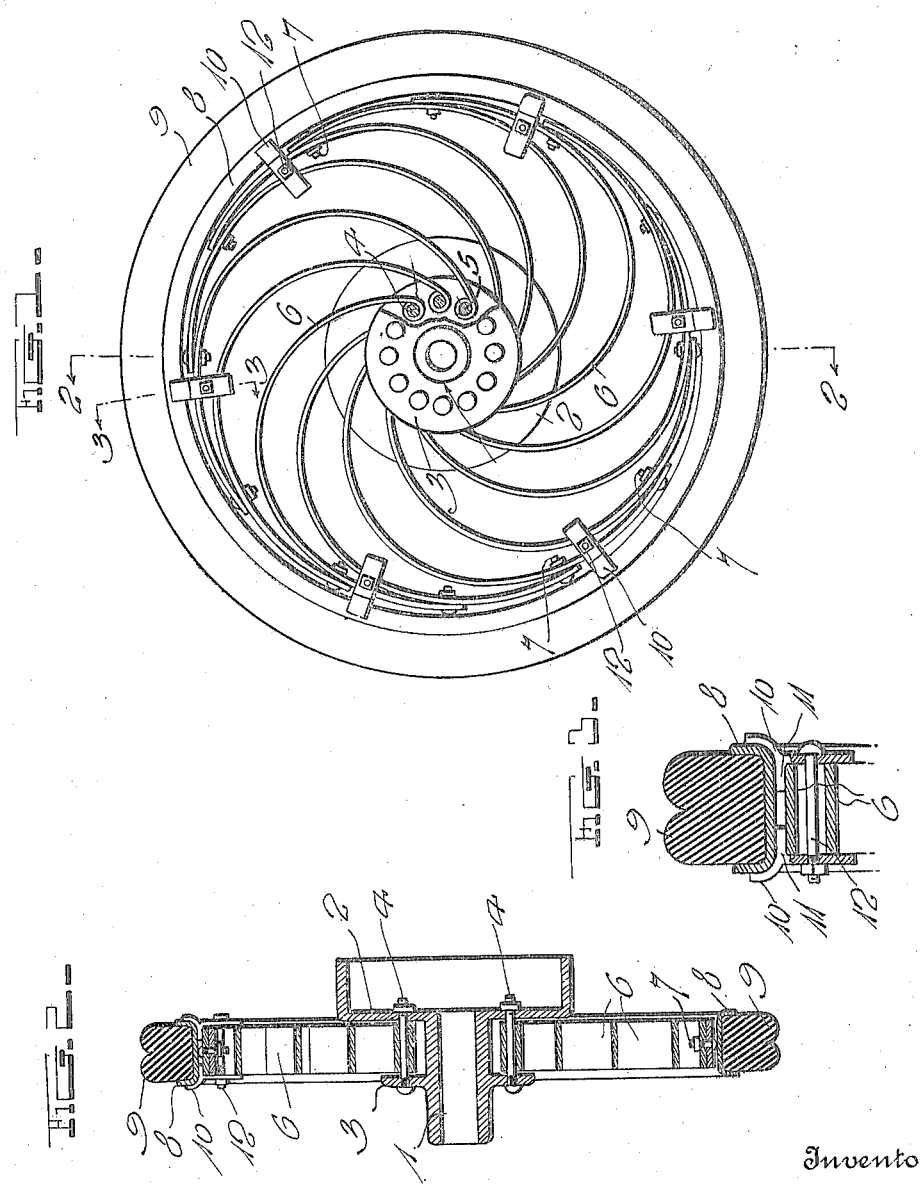

1,441,969

UNITED STATES PATENT OFFICE.

JAMES A. DEVORE, OF MONONGAHELA, PENNSYLVANIA.

SPRING WHEEL.

Application filed August 29, 1921. Serial No. 496,400.

*To all whom it may concern:*

Be it known that I, JAMES A. DEVORE, a citizen of the United States, residing at Monongahela, in the county of Washington and State of Pennsylvania, have invented certain new and useful Improvements in Spring Wheels; and I do declare the following to be a full, clear, and exact description of the invention, such as will enable others skilled in the art to which it appertains to make and use the same.

This invention relates to an improved spring wheel having an improved spring construction consisting of spokes formed of resilient metal and extending from the hub portion of the wheel and curved from the hub portion to the tire carrying rim, the outer end portions of the spokes being securely but releasably connected thus making it unnecessary to provide a felly portion between the spokes and the tire carrying rim.

Another object of the invention is to so construct the spokes that when the outer end portions of the spokes are connected, the tire carrying rim may be put in place and connected with the spokes by improved clamps.

Another object of the invention is to so construct this wheel that when the clamps for holding the tire carrying rim are removed, the tire carrying rim may be taken off without the spring spokes moving out of the proper position.

Another object of the invention is to so construct this wheel that spokes may be individually removed with the tire carrying rim in place and the new spokes put in place when necessary.

Another object of the invention is to provide a spring wheel which will be of a simple construction and very effective in operation.

This invention is illustrated in the accompanying drawings, wherein:

Figure 1 is a view showing the improved wheel in side elevation.

Figure 2 is a vertical sectional view through the wheel taken along the line 2—2 of Fig. 1.

Figure 3 is a sectional view taken along the line 3—3 of Fig. 1.

This wheel is provided with a hub 1 provided at its inner end with a brake drum 2 and intermediate its length with a flange or collar 3, the brake drum and flange being provided with alined openings to receive the securing bolts 4 which extend through eyes 5 at the inner ends of the spokes 6 and serve to secure the spokes between the brake drum and flange. These spokes are formed from strips of spring steel and are curved longitudinally and have their outer end portions extending in overlapping relation and securely but releasably connected by bolts 7. It should be noted that the springs are so curved that the space between them increases from the hub to a point intermediate the hub and outer ends of the spokes and then decreases thus providing springs which will have a very good spring action. The rim 8 which carries the tire 9 is placed about the spokes and it will be readily seen that with the tire in place, any one of the spokes can be easily removed and repaired or a new one put in place. After the tire-carrying rim has been put in place, it must be secured to the spring spokes and in order to do so, there have been provided clamps 10 which are placed upon opposite sides of the rim and spokes and are provided with inwardly extending arms 11 which extend between the rim and the outer end portions of the spokes as shown in Fig. 3. These clamps extend along the sides of the spokes as shown and are provided with alined openings so that a securing bolt 12 may be passed through the clamps and tightened to draw them towards each other into tight binding engagement with the rim and spokes. It should be further noted that each of these bolts passes between two of the spokes and therefore the clamps will be prevented from having movement radially of the wheel and when tightened, a tight binding action will be provided which will serve to securely hold the clamps against movement and prevent the rim from having movement about these spokes. When it is desired to remove the rim, it is simply necessary to remove the bolts 12 thus freeing the rim and permitting it to be easily removed.

I claim:

1. A spring wheel comprising a hub, a tire carrying rim, spokes formed of strips of spring metal and curved longitudinally and having their inner end portions connected with said hub and having their outer end portions extending in overlapping relation with the outer end portion of each spoke extending beyond the outer end portion of an adjoining spoke and resting upon a second adjoining spoke in spaced relation to the outer end thereof, securing bolts for releasably connecting the outer ends of the spokes to the adjoining spokes, and clamps upon opposite sides of the rim and spokes having inwardly extending arms extending between the inner face of the rim and outer end portions of said spokes and having securing bolts for drawing the clamps into tight binding position passing through the wheel from one clamp to another and positioned between outer end portions of the spokes.

2. A spring wheel comprising a hub, a tire carrying rim, spring spokes between the hub and rim formed of strips of resilient material having their inner ends connected with said hub and having their outer end portions extending in overlapping relation with the outer end portion of each spring secured to an adjoining spoke in spaced relation to the outer end thereof, and releasable means for firmly holding the rim in place about the spokes, the rim being removable from about the spokes when said means is released with the spokes remaining connected one with another.

In testimony whereof I have hereunto set my hand.

JAMES A. DEVORE.